(12) United States Patent
Scott

(10) Patent No.: US 7,055,804 B2
(45) Date of Patent: *Jun. 6, 2006

(54) LOAD BINDER WITH INDICATOR

(75) Inventor: Gary M. Scott, Milwaukie, OR (US)

(73) Assignee: Burns Bros., Inc., Lake Oswego, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/117,830

(22) Filed: Apr. 29, 2005

(65) Prior Publication Data

US 2005/0218387 A1    Oct. 6, 2005

Related U.S. Application Data

(63) Continuation-in-part of application No. 10/814,380, filed on Mar. 30, 2004, now Pat. No. 6,945,516.

(51) Int. Cl.
*B66F 3/00* (2006.01)

(52) U.S. Cl. ......................... 254/231; 254/237
(58) Field of Classification Search ........ 254/230–237, 254/243, 244, 247, 249
See application file for complete search history.

(56) References Cited

U.S. PATENT DOCUMENTS

| 1,037,615 | A |   | 9/1912  | Grenier           |
|-----------|---|---|---------|-------------------|
| 2,220,288 | A |   | 11/1940 | Sarosdy           |
| 2,818,229 | A | * | 12/1957 | Guthans ............ 254/235 |
| 3,065,007 | A |   | 11/1962 | Colmer, Jr.       |
| 3,337,014 | A | * | 8/1967  | Sandrick ............ 192/43.1 |
| 3,338,359 | A | * | 8/1967  | Baillie et al. ....... 192/43.1 |
| 4,366,607 | A |   | 1/1983  | MacCuaig          |
| 4,423,639 | A | * | 1/1984  | Grade et al. ........ 73/862.42 |
| 4,830,339 | A | * | 5/1989  | McGee et al. ....... 254/235 |
| 4,901,775 | A | * | 2/1990  | Scott et al. ........ 140/123.5 |
| 5,611,521 | A |   | 3/1997  | Grover et al.     |
| 6,138,532 | A | * | 10/2000 | McCann ............. 81/63 |
| 6,149,132 | A | * | 11/2000 | Ostrobrod ........... 254/368 |

* cited by examiner

*Primary Examiner*—Emmanuel M Marcelo
(74) *Attorney, Agent, or Firm*—Schwabe, Williamson & Wyatt, P.C.

(57) ABSTRACT

A tool for binding and securing the binding of a load, said binding including a tube having a pawl disposed in a housing adapted to engage a gear that may be coupled to a tube, wherein rotation of the gear can cause extension and contraction of shafts with respect to the tube. The pawl having more than one operation configuration, such as a load tightening, load loosening and a free spin position. An indicator coupled to the pawl and adapted to move relative to the housing to indicate the operational configuration by pointing to corresponding markings disposed on the housing.

9 Claims, 3 Drawing Sheets

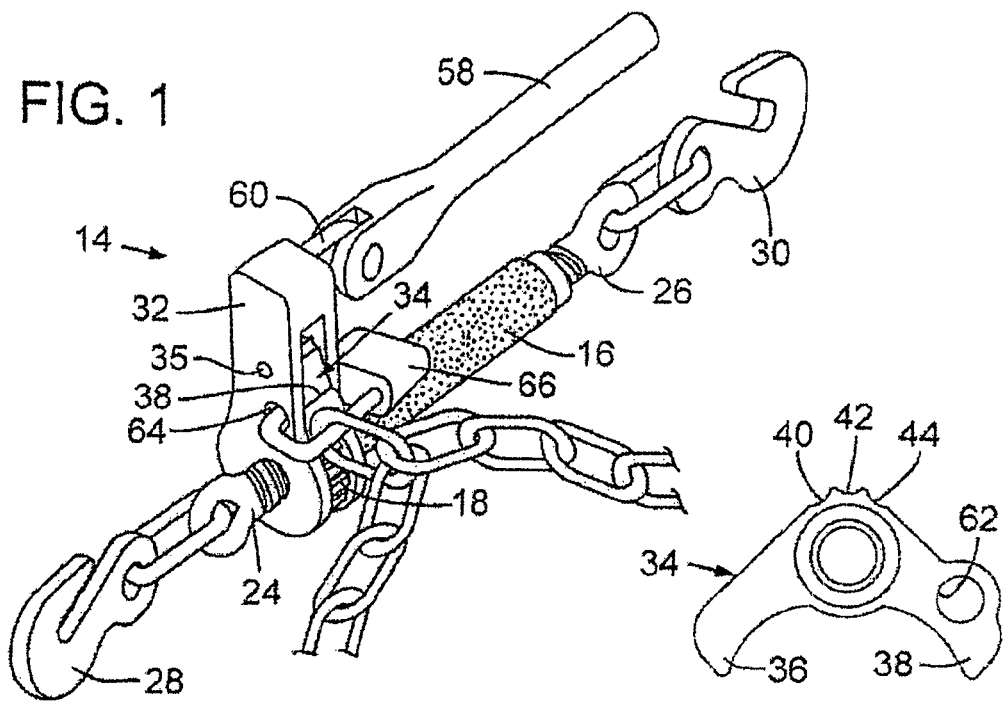
FIG. 1
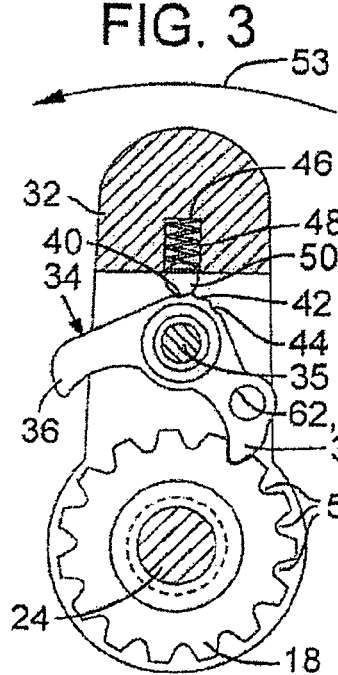
FIG. 3A
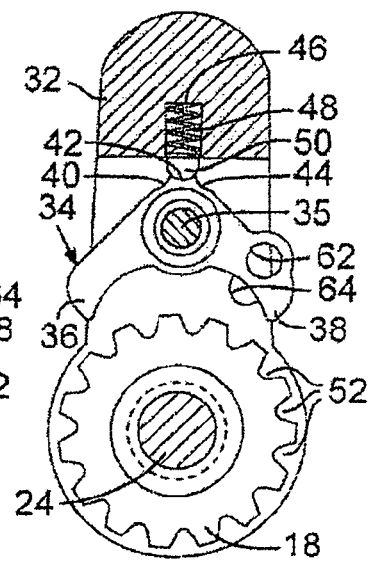
FIG. 3
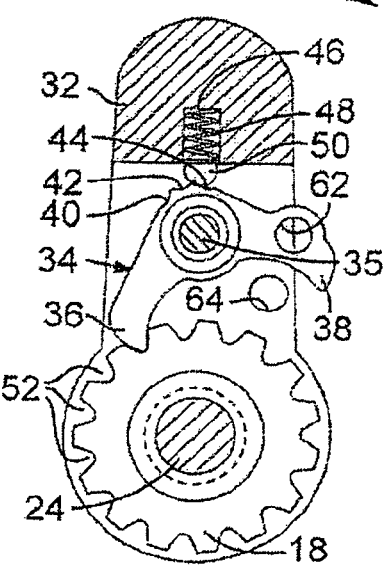
FIG. 4
FIG. 5

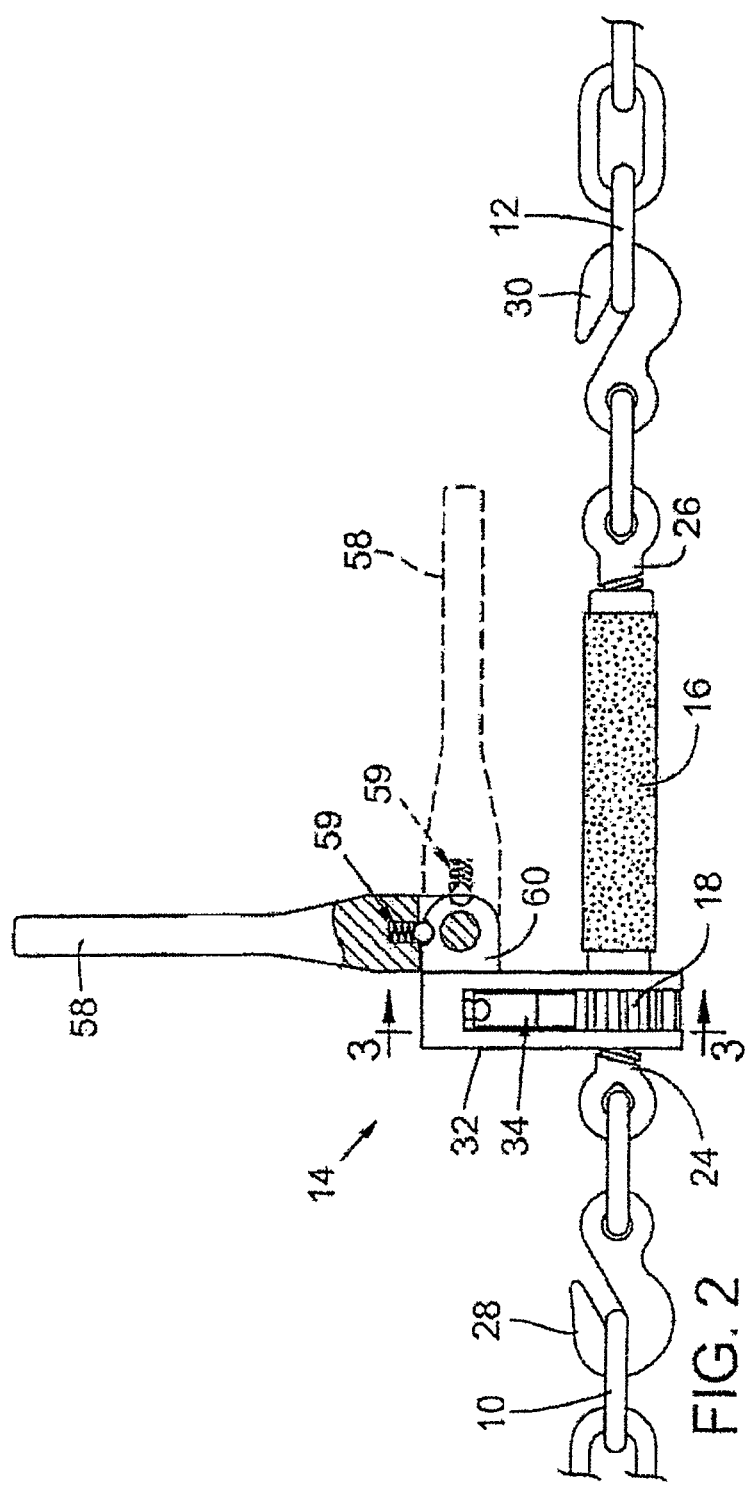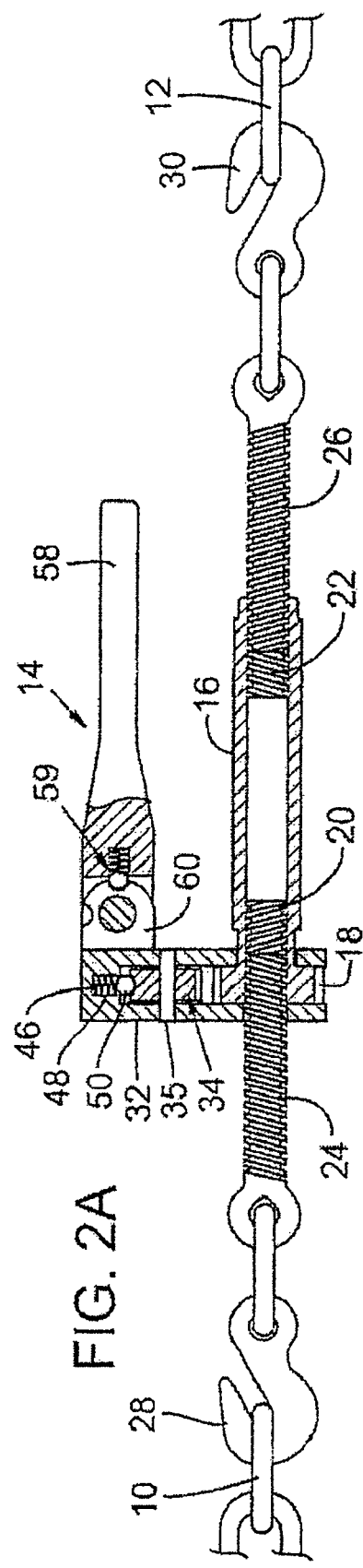

LOAD BINDER WITH INDICATOR

RELATED APPLICATIONS

The present application is a continuation-in-part of U.S. patent application Ser. No. 10/814,380, filed on Mar. 30, 2004 now U.S. Pat. No. 6,945,516.

FIELD OF THE INVENTION

This invention relates to a mechanical device used to tighten and secure bindings such as a link chain being used to stabilize and secure heavy cargo or equipment on a cargo carrying vehicle or vessel such as trucks, trains, planes and ships, and particularly to a load binder having a visual indicator for identifying the operational configuration.

BACKGROUND OF INVENTION

There are numerous examples that can be cited to explain how items are loaded e.g. on flatbed trailers, rail cars, boat decks and the like. All have a common problem that will be here addressed as that problem relates to the loading and hauling of logs by a logging truck. Such is but one example and those skilled in the art will understand that the invention is equally applicable to many other load hauling uses.

Different sizes of logs, e.g., 10–20 inches in diameter and 20–30 feet in length, are commonly hauled from a forest site to a logging mill. The truck traverses rough roads and many curves that produce conditions where the logs can roll off of the truck bed. Each log is very heavy and inadvertent rolling of the log off the load can produce disastrous results and is to be avoided.

It has long been common to secure the load with chains that are wrapped around the entire load of logs. A binder has opposing ends with hooks that are hooked into two spaced apart chain links of the chain. The binder includes a means to draw the hooked links together to tighten the chain and a latch mechanism secures the chain in the tightened condition.

An early version of such a binder is referred to as a lever binder. The lever binder uses an over-center mechanism to draw the chain links together a stated length, e.g., 3 inches. The lever is pivoted using brute force to force the lever to an over-center position and in the process draw the chain ends together by the stated 3 inch margin. No incremental adjustments are available. Should the load shift to cause loosening of the chain, the binder lever has to be released, the hook ends reset, and the lever action repeated. Not only is the tightening effect limited, the substantial energy stored by such over-center tightening can cause kickback that can result in serious injury or even death to the user of the device.

The above lever binder has, more recently, been largely replaced by a ratchet binder. A center tube has left and right hand threads at the tube ends and a threaded shaft moves into and out of each end of the tube. The shafts are fitted with hooks that hook onto the respective chain ends and are prevented from turning. Turning of the tube is achieved by a ratchet mechanism (pawl and ratchet gear) operated with a handle. The handle is worked back and forth to turn the tube relative to the shafts which draws the shafts into the tube and thereby achieves tightening of the chain. The ratchet mechanism can be reversed to extend the shafts from the tube for loosening of the chain binder, again by working the handle back and forth.

The ratchet binder is safer as it does not produce kickback. Also it can be incrementally adjusted to any length within the differential of the shafts being fully extended and fully retracted from the tube ends, e.g., an 8 inch length of draw. It has, however, two primary drawbacks which are speed of operation (or lack thereof) and awkward storage. The handle protrudes from the tube at a right angle and requires storage in a storage space that is the length of the tube and the width of the tube plus handle length.

BRIEF DESCRIPTION OF THE INVENTION

In a preferred embodiment of the invention, the ratchet mechanism as described above is modified to provide the previous two position settings of the mechanism and alternate in-and-out pawl engagement but having a third position where the pawl can be parked in non-engagement position. Thus, where lever force is required to either extend the shafts out or retract the shafts in, the pawl can be biasingly flipped to rotate the tube clockwise or counterclockwise. If, however, at the point where the binding tension is released, the pawl can be retentively centered for non-engagement with the gear, and the tube can be freely hand turned to enable rapid extension or contraction of the shafts.

A further improvement for the preferred embodiment is the provision of a folding handle which allows for a 90 degree position (relative to the tube) for leveraged ratcheting and a parallel position for either storage or at completion of the cinching operation. A still further improvement is the provision of vandal-proof locking of the ratchet mechanism. A housing component and the latching pawl are provided with through bores that become aligned with the pawl in a position for drawing the shafts into the tube. When a fully tightened condition is reached, a lock such as a common padlock can be inserted through the aligned bores and a chain link to ensure that the pawl cannot be released from its contracted position and the binder cannot be removed from the chain.

Yet another improvement is an visual indicator adapted to move with the pivoting of the pawl, which may indicate the particular operation configuration of the load binder. In one embodiment, the indicator may be part of and/or coupled to the pin about which the pawl pivots and thus may indicate position by pointing to positional markings on the housing of the load binder.

The invention as briefly described above in connection with a preferred embodiment of the invention will be more fully understood and appreciated upon reference to the following detailed description, having reference to the accompanying drawings.

BRIEF DESCRIPTION OF DRAWINGS

FIG. 1 is a perspective view of a load binder in accordance with the present invention;

FIG. 2 is a side view of the device of FIG. 1 but illustrating the device in operational conditions;

FIG. 2A is a cross sectional view of the tube and shafts of FIG. 2 but in a fully extended position and illustrating the relative right and left hand threading of the components;

FIGS. 3, 4 and 5 are section views as taken on sections lines 3—3 of FIG. 2 showing the three operational positions of the ratchet mechanism of the device with FIG. 3A specifically illustrating the design of the pawl used in the device.

DETAILED DESCRIPTION OF A PREFERRED EMBODIMENT

Figure 6A:
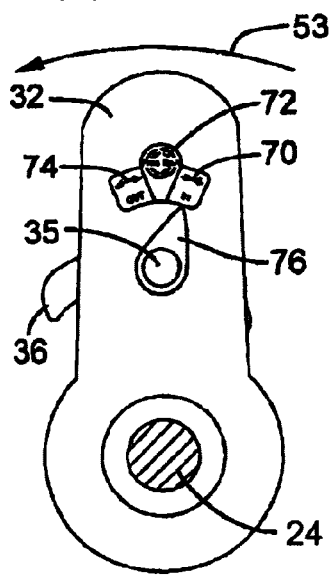
FIGS. 6A–6C are side views of a ratchet binder in accordance with embodiments of the present invention.

Reference is first made to FIG. 2A which illustrates the operation of a ratchet load binder in accordance with the present invention. Chain links 10 and 12 represent spaced apart links, e.g. of a length of chain wrapped around a load, e.g. of logs loaded on a logging truck. Whereas FIGS. 2 and 2A do not show a continuum of the chain links, i.e. links 10 and 12 interconnected by a sequence of links, it is most common to simply connect hooks 28, 30 at the most convenient position along the chain length and drawing of links 10 and 12 together produces a loosening of the intermediate links and it is these links that provide the loosened loop of chain for locking the chain to the ratchet mechanism as seen in FIG. 1 and which will be explained hereafter. Returning now to the description of the ratchet hook binder, device 14 includes a tube 16 with a ratchet gear 18 fixedly secured (as by welding) to one end of the tube 16. Tube 16 is threaded at its inner side with left handed threads 20 at one half and right handed threads 22 at the other half. Shafts 24, 26 are correspondingly threaded so that rotation of tube 16 in one rotative direction relative to both shafts 24, 26 causes both shafts 24, 26 to move inwardly on threads 20, 22 respectively, and rotation of tube 16 in the opposite direction causes both shafts 24, 26 to move outwardly on threads 20, 22 respectively. Thus, with the hook ends 28, 30 prevented from rotating, e.g., as when hooked to chain links 10, 12, rotation of tube 16 produces simultaneous inner or outer movement of both shafts 24, 26.

It will accordingly be understood that with the shafts 24, 26 extended as shown in FIG. 2A, the hooks 28, 30 are secured to the chain ends at those links of the chain most conveniently engageable by the hooks 28, 30 following hand tightening of the chain around the load. As so tightened and as will be explained hereafter, the tube 16 is rotated in a direction that causes the shafts 24, 26 to move into the tube and which thereby further tightens the chain onto the load.

Reference is now made to FIGS. 2 and 3 wherein the ratchet housing 32 is shown assembled onto the end of the tube 16 and surrounding gear 18. As seen most clearly in FIG. 3 (but note also FIGS. 4 and 5), pawl 34 is pivotally mounted via pin 35 to housing 32. Except for the presence of pawl 34, housing 32 is freely rotatable about the gear 18 that is fixed to the end of tube 16.

Reference is now made to FIG. 3A which illustrates pawl 34. Ends 36 and 38 are configured to fit the gullets between the teeth of gear 18 as will be apparent from FIGS. 3 and 5. At the apex of the inverted V-shaped pawl 34 are depressions 40, 42, and 44. From FIGS. 3, 4 and 5 it will be seen that the ratchet housing 32 includes a pocket 46 that contains a spring 48 and pinion 50, which pinion is urged by the spring into contact with the apex position of pawl 34. As viewed in FIG. 3, with pinion 50 seated in depression 40, the housing 32 can be pivoted relative to gear 18 in a counterclockwise direction (as indicated by arrow 53) but not in a clockwise direction. Thus, a counterclockwise rotation of housing 32 will result in the pawl end 38 being cammed out of the gullet 52 (against spring 48) to become seated in the next clockwise gullet 52 without rotation of gear 18. Clockwise pivoting of housing 32 will produce clockwise rotation of gear 18 and such rotation rotates tube 16 which results in inwardly directed movement of shafts 24 and 26.

Manual pivotal movement of the pawl past depression 42 and into depression 44 produces the opposite result i.e. permitted clockwise pivotal movement (arrow 54) of housing 32 relative to gear 18 resulting in pawl end 36 being cammed into a next gullet 52, with counterclockwise movement of housing 32 producing simultaneous rotation of gear 18 and thus tube 16 to produce outwardly directed movement of shafts 24 and 26.

Thus it will be apparent that the pawl positions as between FIG. 3 and FIG. 5 readily produces selected outward or inward movement of shafts 24 and 26, with inward movement providing tightening of the chain.

Reference is now made to FIG. 2 which is a view of the tube 16 including gear 18 with housing 32 and pawl 34 mounted to tube gear 18 and shafts 24, 26 threadably engaged with the tube ends. It will be observed that as is differentiated from FIG. 2A, the shafts 24, 26 are shown near full insertion into the tube 16 as when the chain is fully tightened. The tightening function is preferably accomplished by the use of a handle 58 which is pivotally attached to a lug portion 60 fixed to the inboard side of housing 32. In the pivotal position shown in dash lines, an operator can apply a leveraged force to pivot the housing in either of directions 53 or 54 (FIGS. 3 and 5). The pivotal connection of the handle 58 allows the handle to be pivoted to a parallel and overlying position with tube 16 as seen in solid lines in FIG. 2. Such overlying position is desirable during non-tightening or loosening operation both as a safety provision when the tool is in use for binding a load and for storage when not being used. To assist in retaining either the extended (dash line) or folded position of the handle 58, a spring biased retention mechanism 59 like that of spring 48, pinion 50 and detents 40, 44 is incorporated into the engaging faces of the lever 58 and lug position 60.

It will be appreciated that the ratchet type action is desirable for applying a strong tightening force for cinching the chain links 10 and 12 together. It is also desirable for initial release of the tightening force as when preparing to unload the load. However, the process of ratchet movement of the tube is in small increments and to move the shafts in and out of the tube requires many back and forward movements of lever 58 (a full revolution of the tube may take 20 pulls of the level 58 and generate an 8th of an inch in movement of the shafts. It is desirable to be able to provide relative movement up to 8 or so inches and such full length movement may require hundreds of pulls on the lever.

The third detent 42 shown most clearly in FIG. 3A provides a response to the tedious working of the lever to extend and contract the shafts out of and into the tube 16 when not under load. The pawl 34 is pivoted to the intermediate position of FIG. 4 where the pinion 50 is seated in depression 42 and retains the pawl out of engagement with the teeth of gear 18. Tube 16 may be provided with a rubber like hand grip on its exterior (FIG. 2) but in any event the tube 16 can then be rapidly turned by hand to produce either inward or outward movement of the shafts 24, 26 (the shafts again being held from common rotation with the tube, e.g., by chain links 10, 12 or other means).

A third beneficial feature of the present embodiment of the invention is the provision of a lock that prevents tampering of the tool when in a load tightened condition. See FIGS. 3, 3A, 4 and 5 wherein a through bore 62 is provided in pawl end 38 and a through bore 64 is provided in housing 32. As seen in FIG. 3, with the pawl 34 pivoted to its tightening position, the through bores 62 and 64 are aligned. As seen in FIG. 1, such alignment of the through bores 62, 64 permits the insertion of a lock, illustrated by reference 66. As additional protection against e.g. removal of the device from the load, the loosened lengths of links between links 10 and 12 typically allow for one of these links to be locked to the device as illustrated in FIG. 1.

Figure 6B:
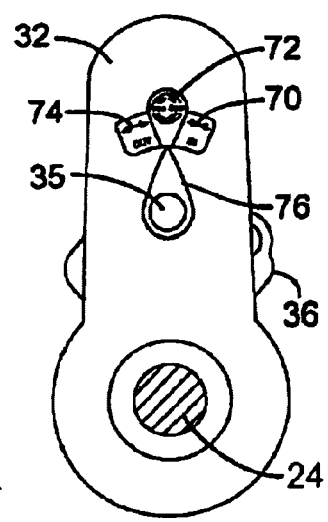
Figure 6C:
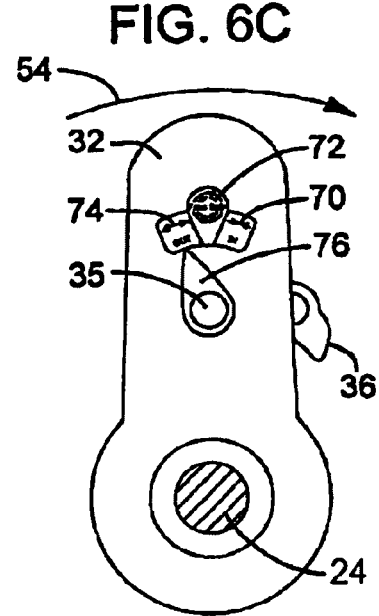

FIGS. 6A through 6C illustrate side views of a ratchet binder in accordance with embodiments of the present invention, where FIG. 6A corresponds to FIG. 3, FIG. 6B corresponds to FIG. 4, and FIG. 6C corresponds to FIG. 5. The ratchet binder housing 32 may be marked with various positional indicators that correspond to a particular operational configuration of the ratchet binder. In one embodiment, for example, the housing 32 may be marked with symbols, words, and the like to indicate an operational configuration.

In the illustrated embodiment, three positional indicators may be used. Position 70 may be marked with inward directed arrows and/or the word "IN" to identify and correspond to the load binder being in an operational configuration where movement of the binder in direction 53 will tighten the chains, straps and the like, as illustrated and described with respect to FIG. 3. Position 72 may be marked with alternating circular arrows and/or the words "Free Spin" to identify and correspond to the load binder being in a free spinning configuration, as illustrated and described with respect to FIG. 4. And, Position 74 may be marked with outward directed arrows and/or the word "OUT" to identify and correspond to the load binder being in an operational configuration where movement of the binder in direction 54 will loosen the chains, straps and the like, as illustrated and described with respect to FIG. 5.

The pawl 36 may be pivotally mounted in the housing 35 by pin 35, and positioned for engagement with the gear (not shown) in either a load tightening position, as illustrated in FIG. 3 or a load loosing position, as illustrated in FIG. 5. The pawl may also be adapted to not engage the gear such that it is in a free spin configuration, as illustrated in FIG. 4.

In one embodiment, an indicator 76 may be coupled to the pin 35 such that as the pawl 36 pivots in the housing 32 from one operational configuration to another operational configuration, indicator 76 may move. As shown in FIG. 6A, indicator 76 may be calibrated such that it points to the "IN" position 70 when the pawl 36 engages the gear 18 as illustrated in FIG. 3. As shown in FIG. 6B, indicator 76 may be calibrated such that it points to the "Free Spin" position 72 when the pawl 36 does not engage gear 18, as illustrated in FIG. 4. Finally, as shown in FIG. 6C, indicator 76 may be calibrated such that it points to the "OUT" position 74 when the pawl 36 engages the gear 18 as illustrated in FIG. 5.

Embodiments of the present invention may include an indicator that is a separate component attached to the pin 35 and/or Pawl such that the indicator may move as the pin and/or the pawl moves from one operational configuration to another. In other embodiments, the indicator may be stamped or otherwise marked into the end of the pin 35, and adapted to indicate a particular position of the pawl relative to the marked housing. In various embodiments of the present invention, the markings on the housing may be permanent, for example stamped into the housing, or maybe affixed through a label or a non-permanent marking means.

By including an indicator and a marked housing with embodiments of the load binder of the present invention, the safety and assurance of the operator is enhanced by virtue of the fact that the operator can visually determine which operational configuration the load binder is in prior to additional manipulation.

Those skilled in the art will likely conceive of numerous modifications and variations of the features described herein which are considered to be applicant's preferred embodiment as of the filing of the application. The somewhat independent features are believed unique including the provision of a free turning pawl position, a storage or inoperable position for the handle, a pawl lock for protection against inadvertent or vandalous loosening of the binder, and a positional indicating means. The appended claims are accordingly intended to be given their broad interpretation and meaning to encompass the full scope of the invention.

What is claimed is:

1. A load binding apparatus comprising:
   a gear coupled to a tube and adapted to cause the tube to rotate around one or more threaded internal shafts to cause contraction and extension of the shafts relative to the tube;
   a housing having markings identifying different operational configurations;
   a pawl having opposing ends adapted to selectively engage the gear, the pawl being pivotally mounted in the housing; and
   an indicator coupled to the pawl and adapted to move relative to the housing as the pawl moves from a first position to a second position, the indicator being calibrated to indicate an operational configuration identified by the markings on the housing depending on the position of the pawl.

2. The load binding apparatus of claim 1, wherein the pawl is adapted for three positive stop positions corresponding to three operational configurations.

3. The load binding apparatus of claim 2, wherein the three operational configurations include a load tightening configuration, a load loosening configuration, and a free spin configuration.

4. The load binding apparatus of claim 1, wherein the pawl is secured in the housing by a pin, the indicator is coupled to the pin and adapted to rotate as the pawl rotates.

5. The load binding apparatus of claim 1, further comprising a spring biased pinion carried by the housing and urged into engagement with the pawl at a position where the pawl ends are out of engagement with the gear such that the load binding apparatus is in the free spin operational configuration.

6. The load binding apparatus of claim 5, comprising wherein the pawl is substantially an inverted V-shape and pivoted near the apex of the V, and the outer surface at the apex includes a center depression into which the pinion extends to retain the pawl in a non-engaging position with the gear.

7. The load binding apparatus of claim 1, wherein a handle protrudes from said housing to provide a lever advantage for pivoting of the pawl housing relative to the shafts, said handle pivotally attached to the housing for selective pivoting of such handle to a substantially parallel relation to the tube.

8. The load binding apparatus of claim 1, wherein the pawl has a through bore mateable to a through bore in the housing to permit the insertion of a lock through the through bores when aligned to prevent pivotal movement of the pawl relative to the housing.

9. A load binding apparatus for securing a binding strap such as a chain around a load comprising:
   an internally threaded tube and opposing open ends, threaded shafts threadably inserted into the opposing open ends and the threading in the tube and on the shafts adapted to provide common contraction and extension of the shafts relative to the tube interior with the shafts not turning and the tube turning;
   a gear fixed to the tube exterior including gear teeth and a pawl and pawl housing mounted over the gear and pivotal around the gear, said pawl having opposing ends adapted for selective pivotal engagement with the gear teeth and as selectively engaging the gear teeth preventing relative rotation of the housing in a selective one of the rotative directions; and an indicator coupled to the pawl and adapted to move relative to the housing as the pawl moves from a first position to a second position, the indicator being calibrated to indicate an operation configuration identified by one or more position identifying markings on the housing;

a handle extended from said housing to provide leverage for an operator to pivot the housing with the pawl engaging the gear of the tube for forced rotation of the tube relative to the shafts, said handle pivotally connected to the housing and as pivoted into an alternate position said handle extended substantially parallel to said tube for convenient storage; and wherein the pawl has a through bore mateable to a through bore in the housing to permit the insertion of a lock through the through bores when aligned to prevent pivotal movement of the pawl relative to the housing.

* * * * *